United States Patent
Lee et al.

(10) Patent No.: US 9,525,706 B2
(45) Date of Patent: Dec. 20, 2016

(54) APPARATUS AND METHOD FOR DIAGNOSING MALICIOUS APPLICATIONS

(71) Applicant: AHNLAB, INC., Gyeonggi-do (KR)

(72) Inventors: Seungwon Lee, Seoul (KR); Donghyun Kang, Seoul (KR); Seol Woo Joo, Gyeonggi-do (KR); Yonggoo Kim, Gyeonggi-do (KR); Changyeon Hwang, Gyeonggi-do (KR)

(73) Assignee: AHNLAB, INC. (KR)

( * ) Notice: Subject to any disclaimer, the term of this patent is extended or adjusted under 35 U.S.C. 154(b) by 36 days.

(21) Appl. No.: 14/425,358

(22) PCT Filed: Jul. 9, 2013

(86) PCT No.: PCT/KR2013/006095
§ 371 (c)(1),
(2) Date: Mar. 3, 2015

(87) PCT Pub. No.: WO2014/035043
PCT Pub. Date: Mar. 6, 2014

(65) Prior Publication Data
US 2015/0229673 A1    Aug. 13, 2015

(30) Foreign Application Priority Data
Sep. 3, 2012 (KR) .................. 10-2012-0097262

(51) Int. Cl.
*G06F 21/00* (2013.01)
*H04L 29/06* (2006.01)
*G06F 21/56* (2013.01)

(52) U.S. Cl.
CPC ............ *H04L 63/20* (2013.01); *G06F 21/56* (2013.01); *H04L 63/1441* (2013.01)

(58) Field of Classification Search
USPC ........................................... 726/1, 2
See application file for complete search history.

(56) References Cited

U.S. PATENT DOCUMENTS

| 7,210,168 B2 * | 4/2007 | Hursey ................ H04L 63/145 726/24 |
| 2011/0154495 A1 * | 6/2011 | Stranne .................. G06F 21/55 726/24 |

(Continued)

FOREIGN PATENT DOCUMENTS

| KR | 1020080074271 | 8/2008 |
| KR | 1020100005518 | 1/2010 |

(Continued)

OTHER PUBLICATIONS

Isohara et al., "Detection Technique of Android Malware with Second Application", Computer Security Symposium 2011, Oct. 2011, p. 708-p. 713.

(Continued)

*Primary Examiner* — Jason Lee
(74) *Attorney, Agent, or Firm* — Bacon & Thomas, PLLC (57) ABSTRACT

An apparatus for diagnosing malicious applications includes: a signature storage unit which stores malicious application executable files, which can be run in a mobile operating system, and common feature information of variant files derived from said malicious application executable files as signature data for diagnosing maliciousness; an information collection unit which collects information corresponding to common feature information from executable files which are targeted for diagnosis and are diagnosed as malicious or not; a diagnosis determination unit which compares the corresponding information collected by the information collection unit with the common feature information stored in the signature storage unit in order to determine whether the application executable files are malicious; and a result provision unit which provides the results of the determination of whether the application executable files are malicious from the diagnosis determination unit.

19 Claims, 5 Drawing Sheets (56) References Cited

U.S. PATENT DOCUMENTS

| | | | | |
|---|---|---|---|---|
| 2012/0110174 A1* | 5/2012 | Wootton | ............... | G06F 21/564 |
| | | | | 709/224 |
| 2016/0099963 A1* | 4/2016 | Mahaffey | ............ | H04L 63/1433 |
| | | | | 726/25 |
| 2016/0112444 A1* | 4/2016 | Palumbo | ............... | G06F 21/567 |
| | | | | 726/23 |

FOREIGN PATENT DOCUMENTS

| KR | 101161493 | 6/2012 |
|---|---|---|
| KR | 1020120093564 | 8/2012 |

OTHER PUBLICATIONS

Dong-Jie Wu et al., "DroidMat: Android Malware Detection through Manifest and API Calls Tracing", Information Security (Asia JCIS), 2012 Seventh Asia Joint Conference, IEEE, Aug. 10, 2012, p. 62-p. 69.

Japanese Office Action issued in counterpart Japanese Application No. 2015-529660 dated Mar. 29, 2016.

\* cited by examiner

FIG. 1

```
/
├─ 10  Android Manifest.xml
├─ 20  META-INF
│      ├─ 21  ANDROID.RSA
│      ├─ 22  ANDROID.SF
│      └─ 23  MANIFEST.MF
├─ assets
│      ├─ numbers.xml
│      └─ trash
├─ 30  classes.dex
├─ res
│      ├─ drawable-hdpi
│      │      └─ ic_launcher.png
│      └─ layout
│             ├─ finish.xml
│             ├─ main.xml
│             └─ rules.xml
└─ 40  resources.arsc
```

APPARATUS AND METHOD FOR DIAGNOSING MALICIOUS APPLICATIONS

TECHNICAL FIELD

The present disclosure relates to an apparatus and method for diagnosing malicious applications; and, more particularly, to an apparatus and method for diagnosing malicious applications, which are adapted to diagnose whether an application execution file is malicious in a mobile operating system.

BACKGROUND ART

Recently, cellular phones that support various functions such as a wireless Internet function and the like, as well as a simple call function, have become prevalent due to the advancement of mobile communication technologies as well as wired/wireless Internet. In particular, widespread smartphones allow for installation of various application programs (hereinafter, abbreviated as "applications") operating in a mobile operating system, and for this reason, users use smartphones for various purposes.

A mobile operating system such as Android, iOS, or a window mobile is installed in these smartphones, and applications executable in various mobile operating systems have been actively developed.

Among such mobile operating systems, an Android platform is an open source platform revealed by open handset alliance (OHA) led by Google Inc., which refers to a software package that includes all of Linux kernel, virtual machine (VM), framework, and application.

Recently, an increase in users' expectation on the Android platform and a fervent response of terminal manufacturers and mobile carriers have promoted the use of Android platform in portable terminals such as smartphones, activating the Android application market and increasing demand for supply of high-quality Android application.

Meanwhile, as smartphones equipped with the Android platform have been increasingly used, malicious codes targeting an Android operating system has also increased, and Android malicious code creators have developed Android malicious applications based on various techniques acquired in the conventional PC environment, at a faster rate than those of PCs.

Figure 1:
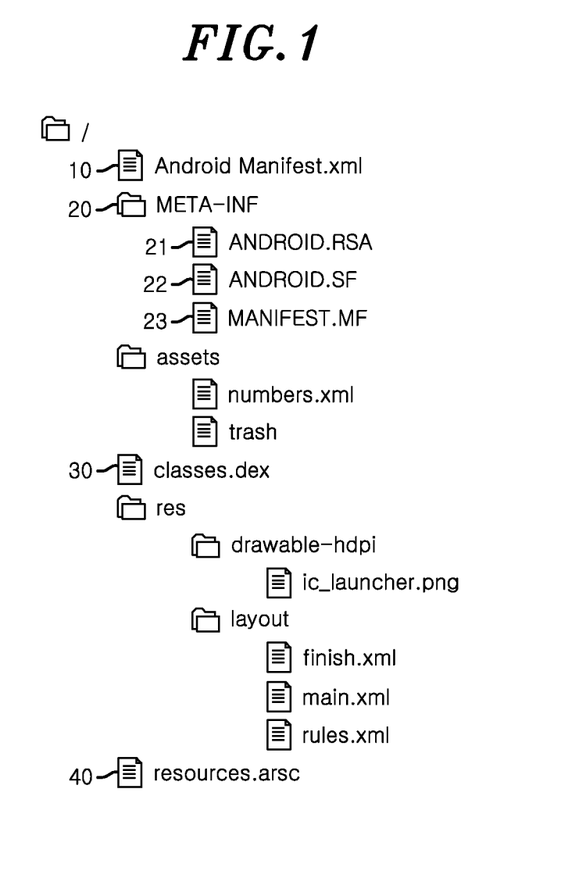
FIG. 1 is a tree structure diagram illustrating an example of an Android package (APK) file as an execution file for installing and operating an application that is driven in an Android platform.

FIG. 1 is a tree structure diagram illustrating an example of an Android package (APK) file as an execution file for installing and operating an application that is driven in an Android platform.

As illustrated in FIG. 1, the Android package file includes a plurality of folders and files in a root, and among the files, an META-INF folder 20, an AndroidManifest.xml file 10, a classes.dex file 30, and a resources.arsc file 40 are essential components. Even if any one of these essential components is not provided, an application cannot be normally installed nor executed. The META-INF folder 20 essentially includes an RSA file 21, an SF file 22, and a MANIFEST.MF file 23 in the lower ranks.

Meanwhile, as a method for creating an Android malicious application, creating an Android malicious application by correcting the AndroidManifest.xml file 10 or the classes.dex file 30 has been typically known.

Thus, in diagnosing a malicious application in a mobile operating system environment according to a related art, hash values of the AndroidManifest.xml file 10 and the classes.dex file 30 determined to be malicious are stored in a signature database in advance, and hash values of the AndroidManifest.xml file 10 and the classes.dex file 30 extracted from an application as a diagnosis target are compared with the signature database, thus diagnosing and determining a malicious application.

According to the related art, a single malicious file may be accurately diagnosed, but a mass of variant files created by using an automation tool or the like cannot be diagnosed whether they are malicious.

DISCLOSURE

Technical Problem

In view of the foregoing problems, the present disclosure provides an apparatus and method for diagnosing malicious applications, which are capable of diagnosing a malicious application by utilizing common feature information which is unchangeable or difficult to transform even in a variant file, targeting an execution file of a malicious application that may be driven in a mobile operating system environment.

Technical Solution

In accordance with an embodiment of the there is an apparatus for diagnosing malicious applications, comprising: a signature storage unit configured to store information of features that are common to a malicious application execution file that may be driven in a mobile operating system (OS) environment and a variant file of the malicious application execution file, as signature data for diagnosing whether a diagnosis target application execution file is malicious; an information collecting unit configured to collect information corresponding to the common feature information from the diagnosis target application execution file; a diagnosing and determining unit configured to compare the collected corresponding information and the common feature information stored in the signature storage unit to determine whether the diagnosis target application execution file is malicious; and a result providing unit configured to provide the result of determining whether the diagnosis target application execution file is malicious.

In the embodiment, the apparatus further comprising: a diagnosis rule storage unit configured to store a diagnosis rule for determining whether the diagnosis target application execution file is malicious by combining a plurality of common feature information, wherein the information collecting unit is configured to collect the common feature information depending on the diagnosis rule.

In the embodiment, the apparatus further comprising: a setting unit configured to request setting of the diagnosis rule, wherein the diagnosis rule set by request of the setting unit is stored in the diagnosis rule storage unit.

In the embodiment, wherein the diagnosis target application execution file is an android package (APK) file, and the information collection unit includes an APK information collecting unit configured to collect information of a file path of the APK file or authentication certificate information.

In the embodiment, the APK information collecting unit is configured to extract a tree structure of files that constitute the APK file to extract a hash value corresponding to a path of the files.

In the embodiment, the APK information collecting unit includes a file path extracting unit configured to extract a path of a specific file that is present in the APK file to extract a hash value corresponding to the path of the corresponding file.

In the embodiment, the APK information collecting unit includes an authentication certificate information extracting unit configured to extract self-signature information of an RSA file that is present in an META-INF folder of the APK file.

In the embodiment, the authentication certificate information extracting unit is configured to extract at least one of a serial number, an Issure DN or validity among the self-signature information.

In the embodiment, the information collecting unit includes a DEX information collecting unit configured to extract features of JAVA class files by analyzing a DEX file within the diagnosis target application execution file.

In the embodiment, the DEX information collecting unit includes an import class extracting unit configured to obtain a CRC using a list of external class information imported by the JAVA files included in the DEX file.

In the embodiment, the DEX information collecting unit includes a proto type extracting unit configured to obtain a CRC by collecting a list of proto types defined in the DEX file.

In the embodiment, the DEX information collecting unit includes a class list extracting unit configured to obtain a CRC by enumerating names of the JAVA class files included in the DEX file.

In the embodiment, the DEX information collecting unit includes a class hash extracting unit configured to extract attribute values or JAVA code command syntax within classes included in the DEX file.

In the embodiment, the information collecting unit includes a manifest information collecting unit configured to collect internal information from an AndroidManifest.xml file within the diagnosis target application execution file.

In the embodiment, the manifest information collecting unit includes an application information extracting unit configured to extract information regarding an application from the AndroidManifest.xml file.

In the embodiment, the manifest information collecting unit includes an XML tree structure extracting unit configured to extract XML tree structure information of the AndroidManifest.xml file, as a hash value.

In the embodiment, the information collecting unit includes a resource information collecting unit configured to extract morphological configuration information of resource structures within a resources.arsc file, as a hash value.

In accordance with an embodiment of the there is a method for diagnosing malicious applications, comprising: storing information of features that are common to a malicious application execution file that may be driven in a mobile operating system (OS) environment and a variant file of the malicious application execution file, as signature data for diagnosing whether a diagnosis target application execution file is malicious; collecting information corresponding to the common feature information from the diagnosis target application execution file; comparing the collected corresponding information with the common feature information stored as the signature data to determine whether the diagnosis target application execution file is malicious; and providing the result of determining whether the diagnosis target application execution file is malicious.

In the embodiment, the method further comprising: storing a diagnosis rule for determining whether the diagnosis target application execution file is malicious by combining a plurality of common feature information, wherein the collecting includes collecting the common feature information depending on the diagnosis rule.

In the embodiment, the method of claim 19, further comprising: requesting setting of the diagnosis rule, wherein the diagnosis rule is stored upon request of the setting.

In accordance with an embodiment of the there is a non-transitory computer-readable recording medium storing a program including instructions which causes a computer to execute each of steps of a method for diagnosing malicious applications, the method comprising: storing information of features that are common to a malicious application execution file that may be driven in a mobile operating system (OS) environment and a variant file of the malicious application execution file, as signature data for diagnosing whether a diagnosis target application execution file is malicious; collecting information corresponding to the common feature information from the diagnosis target application execution file; comparing the collected corresponding information with the common feature information stored as the signature data to determine whether the diagnosis target application execution file is malicious; and providing the result of determining whether the diagnosis target application execution file is malicious.

Advantageous Effects

In accordance with the exemplary embodiments of the present disclosure, it is possible to diagnose a malicious application by utilizing common feature information which is unchangeable or difficult to transform even in a variant file, targeting an execution file of a malicious application that may be driven in a mobile operating system environment.

Thus, whether variant malicious files which are externally different but intrinsically the same or a new malicious file are malicious can be diagnosed and determined by utilizing previously obtained diagnosis data. In addition, when common feature information of normal applications are secured as diagnosis data and separately managed as a white list, the possibility of erroneously determining a normal application as a malicious application can be considerably reduced.

BEST MODE

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Figure 2:
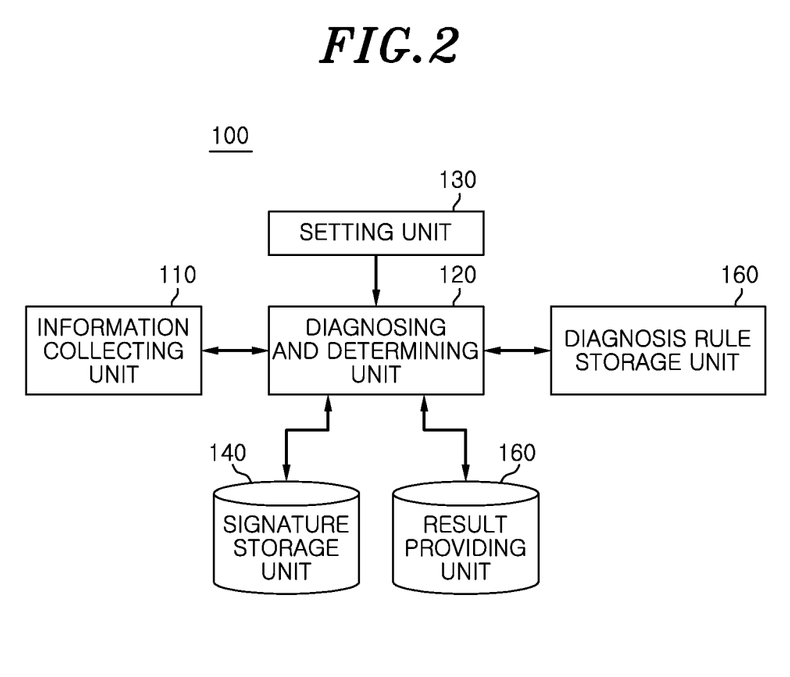
FIG. 2 is a block diagram of an apparatus for diagnosing malicious applications in accordance with an embodiment of the present disclosure.

FIG. 2 is a block diagram of an apparatus for diagnosing malicious applications in accordance with an embodiment of the present disclosure.

As illustrated therein, an malicious application diagnosing apparatus 100 includes an information collecting unit 110, a diagnosing and determining unit 120, a setting unit 130, a signature storage unit 140, a diagnosis rule storage unit 150, a result providing unit 160, and the like.

The signature storage unit 140 stores information of features that are common to a malicious application execution file that may be driven in a mobile operating system (OS) environment and a variant file of the malicious application execution file, as signature data for diagnosing whether a diagnosis target application execution file is malicious. The signature storage unit 140 may store a plurality of common feature information related to a single application execution file.

The information collecting unit 110 collects information corresponding to the common feature information stored in the signature storage unit 140 from a diagnosis target application execution file as a target to be diagnosed as to whether it is malicious. The information collecting unit 110 may collect information corresponding to the common feature information from an application execution file depending on a diagnosis rule stored in the diagnosis rule storage unit 150. That is, it may be considered that the information collecting unit 110 collects common feature information with a malicious application execution file from the diagnosis target application execution file.

The diagnosing and determining unit 120 compares the information corresponding to the common feature information collected by the information collecting unit 110 with the common feature information stored in the signature storage unit 140 to diagnose and determine whether an application execution file is malicious.

The result providing unit 160 provides the result of determining whether the application execution file is malicious, performed by the diagnosing and determining unit 120, to the outside.

The diagnosis rule storage unit 150 stores a diagnosis rule for determining whether an application execution file is malicious by combining a plurality of common feature information.

The setting unit 130 provides an interface that allows for inputting various commands to the malicious application diagnosing apparatus 100, and setting of a diagnosis rule may be requested through the setting unit 130. Upon a request from the setting unit 130, the diagnosing and determining unit 120 may set a diagnosis rule and store the same in the diagnosis rule storage unit 150.

Figure 3:
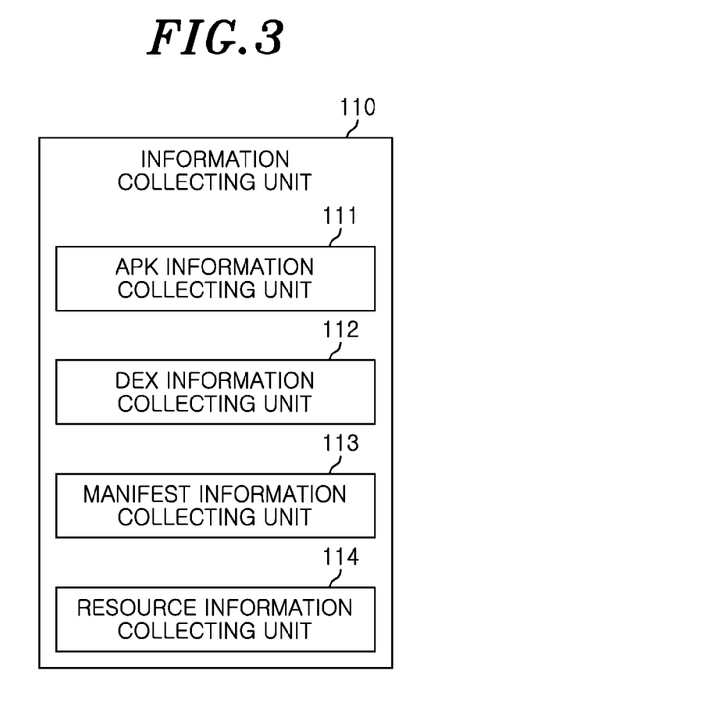
FIG. 3 is a detailed configuration diagram of an information collecting unit in accordance with an embodiment of the present disclosure.

FIG. 3 is a detailed configuration diagram of the information collecting unit 110 in accordance with an embodiment of the present disclosure.

As illustrated therein, the information collecting unit 110 includes an APK information collecting unit 111, a DEX information collecting unit 112, a manifest information collecting unit 113, a resource information collecting unit 114, and the like.

The APK information collecting unit 111 may collect information of a file path of an APK compression file or authentication certificate information.

The DEX information collecting unit 112 may analyze a DEX file to extract features of JAVA class files.

The manifest information collecting unit 113 may collect internal information of an AndroidManifest.xml file.

The resource information collecting unit 114 may extract morphological configuration information of resource structures of a resources.arsc file, as a hash value.

Figure 4:
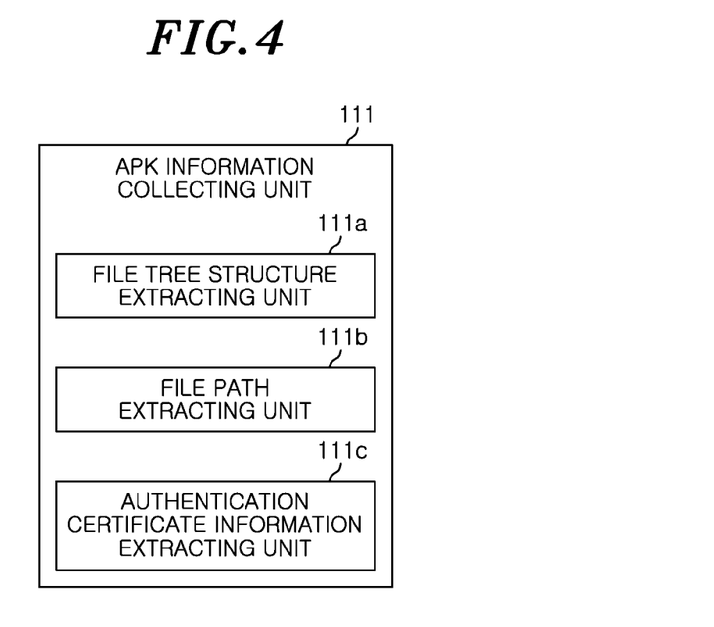
FIG. 4 is a detailed configuration diagram of an APK information collecting unit in accordance with an embodiment of the present disclosure.

FIG. 4 is a detailed configuration diagram of the APK information collecting unit 111 in accordance with an embodiment of the present disclosure.

As illustrated therein, the APK information collecting unit 111 includes a file tree structure extracting unit 111a, a file path extracting unit 111b, an authentication certificate information extracting unit 111c, and the like.

The file tree structure extracting unit 111a may extract a tree structure of files that constitute an APK compression file to extract a hash value corresponding to a path of the files.

The file path extracting unit 111b may extract a path of a specific file that is present in the APK compression file to extract a hash value corresponding to a path of the corresponding file.

The authentication certificate information extracting unit 111c may extract self-signature information of an RSA file that is present in a META-INF folder within the APK compression file. The authentication certificate information extracting unit 111c may extract a serial number, an Issure DN, or validity among the self-signature information.

Figure 5:
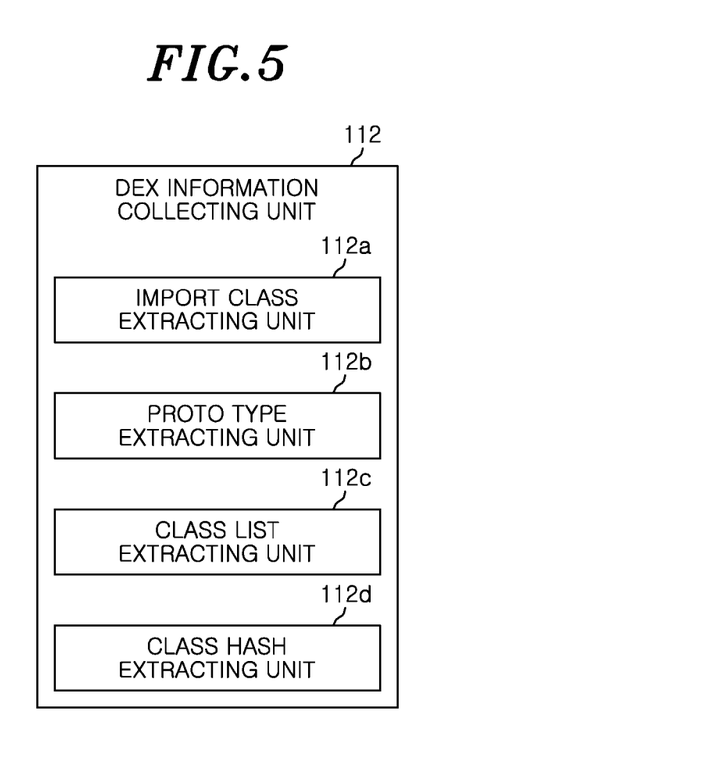
FIG. 5 is a detailed configuration diagram of a DEX information collecting unit in accordance with an embodiment of the present disclosure.

FIG. 5 is a detailed configuration diagram of the DEX information collecting unit 112 in accordance with an embodiment of the present disclosure.

As illustrated therein, the DEX information collecting unit 112 includes an import class extracting unit 112a, a proto type extracting unit 112b, a class list extracting unit 112c, and a class hash extracting unit 112d.

The import class extracting unit 112a may obtain a cyclic redundancy check (CRC) by using a list of external class information imported by JAVA files included in a DEX file.

The proto type extracting unit 112b may obtain a CRC by collecting proto type lists defined in the DEX file.

The class list extracting unit 112c may obtain a CRC by enumerating names of JAV class files included in the DEX file.

The class hash extracting unit 112d may extract attribute values of classes included in the DEX file or a JAVA code command syntax thereof.

Figure 6:
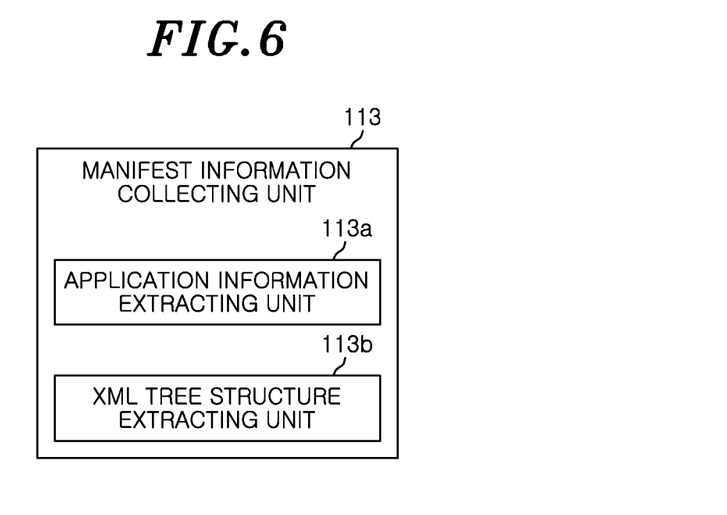
FIG. 6 is a detailed configuration diagram of a manifest information collecting unit in accordance with an embodiment of the present disclosure.

FIG. 6 is a detailed configuration diagram of the manifest information collecting unit 113 in accordance with an embodiment of the present disclosure.

As illustrated therein, the manifest information collecting unit 113 includes an application information extracting unit 113a and an XML tree structure extracting unit 113b.

The application information extracting unit 113a may extract information regarding an application from an AndroidManifest.xml file.

The XML tree structure extracting unit 113b may extract XML tree structure information of the AndroidManifest.xml file, as a hash value.

Figure 7:
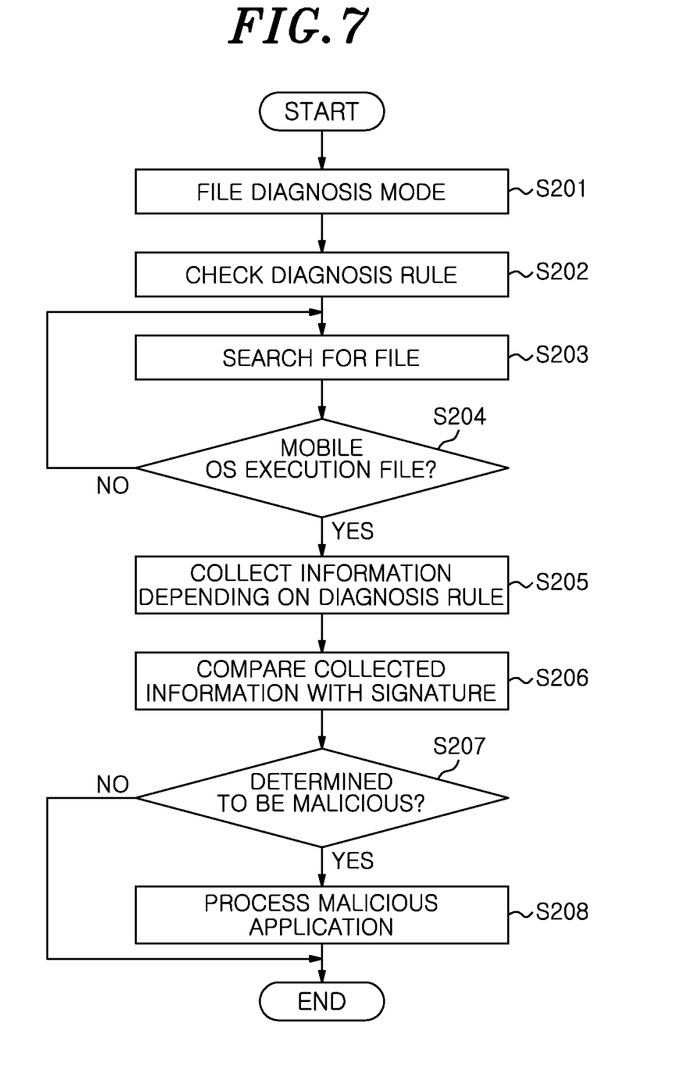
FIG. 7 is a flowchart for describing a method for diagnosing malicious applications in accordance with an embodiment of the present disclosure.

FIG. 7 is a flowchart illustrating a method for diagnosing malicious applications in accordance with an embodiment of the present disclosure.

As illustrated therein, a malicious application diagnosing method by the malicious application diagnosing apparatus 100 in accordance with an embodiment of the present disclosure includes storing a plurality of common feature information that are common to a malicious application execution file that may be driven in a mobile operating system (OS) environment and a variant file of the malicious application execution file, as signature data for diagnosing whether a diagnosis target application execution file is malicious, and a diagnosis rule for determining whether an application execution file is malicious by combining the common feature information, and in this state, entering a file diagnosis mode (S201); checking the pre-stored diagnosis rule after entering the file diagnosis mode (S202); searching for a file in the mobile operating system environment to determine a mobile operating system execution file (S203 and S204); collecting information corresponding to the common feature information depending on the pre-stored diagnosis rule from the determined mobile operating system execution file (S205); comparing the information corresponding to the collected common feature information with the pre-stored signature data to determine whether the application execution file is malicious (S207); and performing a malicious application process, such as providing the result of determining whether the application execution file is malicious based on the determination, to the outside (S208). For example, in step S201, in storing the diagnosis rule for determining whether a diagnosis target application execution file is malicious, when setting of the diagnosis rule is requested from the outside, the diagnosis rule may be set depending on the request.

Hereinafter, the malicious application diagnosing method by the malicious application diagnosing apparatus in accordance with an embodiment of the present disclosure will be described in more detail with reference to FIGS. 1 to 7.

First, the signature storage unit 140 of the malicious application diagnosing apparatus 100, targeting a malicious application execution file that may be driven in a mobile operating system (OS) environment and a variant file of the malicious application execution file, stores a plurality of common feature information as signature data for diagnosing whether a diagnosis target application execution file is malicious.

Here, the plurality of common feature information stored as signature data by the signature storage unit 140 are extracted from a folder or a file essentially included in an application execution file. For example, the plurality of common feature information may be extracted from the META-INF folder 20 of an android package (APK) file, the AndroidManifest.xml file 10, the classes.dex file 30, or the resources.arsc file 40.

The signature data stored in the signature storage unit 140 is the same type of information as that collected by the information collecting unit 110 from a diagnosis target application execution file that is driven in a mobile OS environment. Details of the signature data will be described in an information collecting process performed by the information collecting unit 110 in step S205.

When the process of storing the signature data is performed by the signature storage unit 140 in this manner, the malicious application diagnosing apparatus 100 may perform a file diagnosis mode in step S201, but beforehand, the malicious application diagnosing apparatus 100 may first perform a process of setting a diagnosis rule for diagnosing a malicious application.

To this end, the setting unit 130 provides a user interface that allows for inputting various commands to the malicious application diagnosing apparatus 100, and when setting of a diagnosis rule is requested through the user interface, the setting unit 130 stores a diagnosis rule for diagnosing a malicious application in the diagnosis rule storage unit 150. Here, the diagnosis rule refers to designating which of signature data stored in the signature storage unit 140 is to be used for diagnosing a malicious application. That is, a diagnosis rule for determining whether an application execution file is malicious may be designated and stored by combining the plurality of common feature information stored in the signature storage unit 140.

Next, in a state in which the diagnosis rule is stored, the malicious application diagnosing apparatus 100 enters a file diagnosis mode (S201).

When the malicious application diagnosing apparatus 100 enters the file diagnosis mode, the diagnosing and determining unit 120 checks the diagnosis rule pre-stored in the diagnosis rule storage unit 150, and requests the information collecting unit 110 to search for a file and collect information depending on the checked diagnosis rule (S202).

The information collecting unit 110 searches for a file in the mobile OS environment (S203), and determines whether a searched file is a mobile OS execution file (S204). For example, in the case of the Android platform, the information collecting unit 110 determines whether a searched file is an Android package (APK) file.

Here, the information collecting unit 110 collects information corresponding to common feature information depending on the pre-stored diagnosis rule from mobile OS execution files (S205).

Any one or a plurality of the APK information collecting unit 111, the DEX information collecting unit 112, the manifest information collecting unit 113, and the resource information collecting unit 114 that constitute the information collecting unit 110 may operate depending on the diagnosis rule pre-stored in the diagnosis rule storage unit 150.

The APK information collecting unit 111 collects information of a file path of an APK compression file or authentication certificate information. Any one or a plurality of the file tree structure extracting unit 111a, the file path extracting unit 111b, and the authentication certificate information extracting unit 111c that constitute the APK information collecting unit 111 may operate depending on the diagnosis rule pre-stored in the diagnosis rule storage unit 150.

The file tree structure extracting unit 111a extracts a tree structure of files that constitutes an APK compression file to extract a hash value corresponding to a path of the files. For the APK compression file, a creator may autonomously designate a file name and a storage path, excluding a file that needs to be essentially present. A tree structure of tiles is extracted from the APK compression file and every path name of the files is extracted as a hash value, and a hash value corresponding to every path name of the detected files may be used as a signature for distinguishing the same type of files. Once a malicious file is created, even though a variant is created thereafter, an internal file configuration is not changed in most cases, and thus, a diagnosis rate of this method is effective.

The file path extracting unit 111b extracts a path of a specific file that is present in the APK compression file to extract a hash value corresponding to a path of the corresponding file. In this manner, by extracting the path of the specific file that is present in the APK compression file and extracting the hash value of the file, it may be used as a signature for distinguishing the same type of files. Compared with the use of the file tree structure extracting unit 111a, a wider range of variable files may be effectively diagnosed.

The authentication certificate information extracting unit 111c extracts self-signature information of the RSA file 21 that is present in the META-INF folder 20 within the APK compression file. The authentication certificate information extracting unit 111c may extract a serial number, an Issure DN, or validity among the self-signature information. The authentication certificate file exists as the MANIFEST.MF file 23, a user designated file name.SF file 22, and a file name.RSA file 21 that is the same as a file of an SF extension, in the META-INF folder 20 within the APK compression file. Among them, the RSA file 21 includes an X.509 type self-signature, and a serial number, an Issure DN, and validity (Not Before, Not After) among the contents of the X509 authentication certificate are extracted and combined to be used as a signature for distinguishing the same type of files.

The DEX information collecting unit 112 analyzes the classes.dex file 30 to extract features of JAVA class files. The classes.dex file 30 includes a code created by an application creator in a JAVA programming language, in a binary form. The classes.dex file 30 is analyzed to extract features of the JAVA class files and the extracted features are utilized as a diagnosis point.

Any one or a plurality of the import class extracting unit 112a, the proto type extracting unit 112b, the class list extracting unit 112c, and the class hash extracting unit 112d that constitute the DEX information collecting unit 112 may operate depending on the diagnosis rule previously stored in the diagnosis rule storage unit 150.

The import class extracting unit 112a obtains a cyclic redundancy check (CRC) by using a list of external class information imported by JAVA files included the classes.dex file 30, and utilizes the same as a diagnosis point.

The proto type extracting unit 112b obtains a CRC by collecting proto type lists defined in the classes.dex file 30, and utilizes the same as a diagnosis point. Here, only a format of a user definition class, a function, and a variable may be included.

The class list extracting unit 112c obtains a CRC by enumerating names of JAV class files included in the classes.dex file 30, and utilizes the same as a diagnosis point. Two types of CRCs are extracted, and here, one of the CRCs is a CRC that enumerates only names of classes and the other also includes names of classes and information of a path. An actual malicious behavior occurs in a JAVA code, and a malicious code may be accurately detected by using the information extracted from a corresponding class. Further, when extracting features thereof, information extracted as having four levels are differentiated, and thus, a transformed code may also be detected.

The class hash extracting unit 112d extracts attribute values of classes included in the classes.dex file 30 or a JAVA code command syntax thereof. An attribute value of a class as first extraction target information is static fields size, instance fields size, direct methods size, virtual methods size, static fields name & type, instance fields name & type, method name & type, method registers count, method in-out arguments, method tries length, method instruction size, or the like, and the JAVA code command syntax as second hash extraction target information is all opcodes, const value, all const*, return, if, goto, const-string, or the like. One or a combination of several values among the foregoing items may be used to determine a malicious application by the diagnosis rule stored in the diagnosis rule storage unit 150.

The manifest information collecting unit 113 collects internal information of the AndroidManifest.xml file 10.

Any one or a plurality of the application information extracting unit 113a and the XML tree structure extracting unit 113b that constitute the manifest information collecting unit 113 may operate depending on the diagnosis rule pre-stored in the diagnosis rule storage unit 150.

The application information extracting unit 113a extracts information regarding an application from an AndroidManifest.xml file 10. The AndroidManifest.xml file 10 describes basic information to be known by a system to execute an application. Such information may include Permission, Version (Product: SDK), Receiver, Activity, Service, and the like, including a package name, and is maintained as the same value or structure when an application is updated, in many cases. The application information extracting unit 113a uses internal information of the AndroidManifest.xml file 10 which is not easily changed even though an application is updated, in order to diagnose a malicious application. The AndroidManifest.xml file 10 expresses information regarding an application, in the form of a character string. Every information described above, such as a package name, and permission, of an application may be directly extracted, and thus, unique information may be utilized as a character string-based diagnosis signature.

The XML tree structure extracting unit 113b extracts XML tree structure information of the AndroidManifest.xml file 10, as a hash value. The AndroidManifest.xml file 10 follows the XML standards. Every information is included in a tree structure of each node. The tree structure in the XML is the same as a framework of a life, and this structure is the same in applications having a similar function. This structure may be extracted in a hash form and used as a diagnosis signature.

The resource information collecting unit 114 extracts morphological configuration information of resource structures of the resources.arsc file 40, as a hash value.

For example, a type of malicious mobile Trojan horse file internally has the almost same resource (figure, character string) in terms of operation character. Thus, when the feature of resource which is not frequently changed is determined as a diagnosis rule, a plurality of variant files can be diagnosed at a time. The Android execution file supports various resources (image, character string, icon, sound, layout, music, video, others). In order to support various resource files as such, the interior of the resources.arsc file 40 is a collection of various types of structures. For example, there are BASIC_HEADER, RESOURCE_HEADER, STRING_BLOCK, PACKAGE_BLOCK, TYPE_BLOCK, CONFIG_BLOCK, CONFIG_FLAGS, ENTRY_BLOCK, and the like.

The resource information collecting unit 114 extracts a morphological configuration of resource structures within the resources.arsc file 40, as a hash form, and uses the same as diagnosis data.

First, the number of BASIC_HEADER and a hash value of a start position array of each BASIC_HEADER structure that is present in the resources.arsc file 40 may be extracted and used as diagnosis data.

Second, the number of character strings that is present in a STRING_BLOCK structure, an overall size of character strings, a hash value of a character string position array, and an overall character string hash value may be extracted and used as diagnosis data.

Third, the number of TYPE_BLOCK that is present in a PACKAGE_BLOCK structure and a hash value of a TypeId member array of the TYPE_BLOCK structure may be extracted and used as diagnosis data.

Fourth the number of Entry within a CONFIG_BLOCK structure, a hash value of a SpecNameId array, and a hash value of an Entry buffer start position array may be extracted and used as diagnosis data.

The resource diagnosing scheme using the information collected by the resource information collecting unit 114 is effective to variant malicious files using a graphic user interface (GUI).

As described above, the information collecting unit 110 collects information depending on the diagnosis rule and provides the same to the diagnosing and determining unit 120. The diagnosing and determining unit 120 compares the information collected by the information collecting unit 110 with signature data pre-stored in the signature storage unit 140 (S206), and diagnoses and determines whether an application execution file is malicious based on the comparison result (S207).

Further, when an inspection target application is determined to be malicious by the diagnosing and determining unit 120, the result providing unit 160 provides the result of determination as to whether the application execution file is malicious by the diagnosing and determining process to the outside, thus processing a malicious application (S208).

Although exemplary embodiments of the present disclosure are described above with reference to the accompanying drawings, those skilled in the art will understand that the present disclosure may be implemented in various ways without changing the necessary features or the spirit of the present disclosure.

Therefore, it should be understood that the exemplary embodiments described above are not limiting, but only an example in all respects. The scope of the present disclosure is expressed by claims below, not the detailed description, and it should be construed that all changes and modifications achieved from the meanings and scope of claims and equivalent concepts are included in the scope of the present disclosure.

The invention claimed is:

1. An apparatus for diagnosing malicious applications, comprising:
a signature storage unit configured to store common feature information regarding features that are common to a malicious application execution file configured to be driven in a mobile operating system (OS) environment and a variant file of the malicious application execution file, as signature data for diagnosing whether a diagnosis target application execution file is malicious;
an information collecting unit configured to collect information corresponding to the common feature information from the diagnosis target application execution file;
a diagnosing and determining unit configured to compare the information corresponding to the common feature information and the common feature information stored in the signature storage unit to determine whether the diagnosis target application execution file is malicious; and
a result providing unit configured to provide the result of determining whether the diagnosis target application execution file is malicious,
wherein the information collection unit is further configured to extract a tree structure of files that constitute the diagnosis target application execution file to thereby extract a hash value corresponding to the tree structure; and
wherein the diagnosis target application execution file is an android package (APK) file, and the information collection unit includes an APK information collecting unit configured to collect information of a file path of the APK file or authentication certificate information.

2. The apparatus of claim 1, further comprising:
a diagnosis rule storage unit configured to store a diagnosis rule for determining whether the diagnosis target application execution file is malicious by combining a plurality of common feature information, wherein the information collecting unit is configured to collect the common feature information depending on the diagnosis rule.

3. The apparatus of claim 1, further comprising:
a setting unit configured to request setting of the diagnosis rule,
wherein the diagnosis rule set by request of the setting unit is stored in the diagnosis rule storage unit.

4. The apparatus of claim 1, wherein the APK information collecting unit includes a file path extracting unit configured to extract a path of a specific file that is present in the APK file to extract a hash value corresponding to the path of the corresponding file.

5. The apparatus of claim 1, wherein the APK information collecting unit includes an authentication certificate information extracting unit configured to extract self-signature information of an RSA file that is present in an META-INF folder of the APK file.

6. The apparatus of claim 4, wherein the authentication certificate information extracting unit is configured to extract at least one of a serial number, an Issure DN or validity among the self-signature information.

7. The apparatus of claim 1, wherein the information collecting unit includes a DEX information collecting unit configured to extract features of class files which are generated using an objected-oriented programming language by analyzing a DEX file within the diagnosis target application execution file.

8. The apparatus of claim 7, wherein the DEX information collecting unit includes an import class extracting unit configured to obtain a CRC using a list of external class information imported by the class files included in the DEX file.

9. The apparatus of claim 7, wherein the DEX information collecting unit includes a proto type extracting unit configured to obtain a CRC by collecting a list of proto types defined in the DEX file.

10. The apparatus of claim 7, wherein the DEX information collecting unit includes a class list extracting unit configured to obtain a CRC by enumerating names of the class files included in the DEX file.

11. The apparatus of claim 7, wherein the DEX information collecting unit includes a class hash extracting unit configured to extract attribute values or code command syntax within classes included in the DEX file.

12. The apparatus of claim 1, wherein the information collecting unit includes a manifest information collecting unit configured to collect internal information from an AndroidManifest.xml file within the diagnosis target application execution file.

13. The apparatus of claim 12, wherein the manifest information collecting unit includes an application information extracting unit configured to extract information regarding an application from the AndroidManifest.xml file.

14. The apparatus of claim 12, wherein the manifest information collecting unit includes an XML tree structure extracting unit configured to extract XML tree structure information of the AndroidManifest.xml file, as a hash value.

15. The apparatus of claim 1, wherein the information collecting unit includes a resource information collecting unit configured to extract morphological configuration information of resource structures within a resources.arsc file, as a hash value.

16. A method for diagnosing malicious applications, comprising:
   storing common feature information regarding features that are common to a malicious application execution file that configured to be driven in a mobile operating system (OS) environment and a variant file of the malicious application execution file, as signature data for diagnosing whether a diagnosis target application execution file is malicious;
   collecting information corresponding to the common feature information from the diagnosis target application execution file;
   comparing the information corresponding to the common feature information with the common feature information stored as the signature data to determine whether the diagnosis target application execution file is malicious; and
   providing the result of determining whether the diagnosis target application execution file is malicious,
   wherein said collecting the information includes extracting a tree structure of files that constitute the diagnosis target application execution file to thereby extract a hash value corresponding to the tree structure; and
   wherein the diagnosis target application execution file is an android package (APK) file, and said collecting the information further includes collecting information of a file path of the APK file or authentication certificate information.

17. The method of claim 16, further comprising:
   storing a diagnosis rule for determining whether the diagnosis target application execution file is malicious by combining a plurality of common feature information,
   wherein the collecting includes collecting the common feature information depending on the diagnosis rule.

18. The method of claim 17, further comprising:
   requesting setting of the diagnosis rule, wherein the diagnosis rule is stored upon request of the setting.

19. A non-transitory computer-readable recording medium storing a program including instructions which causes a computer to execute each of steps of a method for diagnosing malicious applications, the method comprising:
   storing common feature information regarding features that are common to a malicious application execution file that configured to be driven in a mobile operating system (OS) environment and a variant file of the malicious application execution file, as signature data for diagnosing whether a diagnosis target application execution file is malicious;
   collecting information corresponding to the common feature information from the diagnosis target application execution file;
   comparing the information corresponding to the common feature information with the common feature information stored as the signature data to determine whether the diagnosis target application execution file is malicious; and
   providing the result of determining whether the diagnosis target application execution file is malicious,
   wherein said collecting the information includes extracting a tree structure of files that constitute the diagnosis target application execution file to thereby extract a hash value corresponding to the tree structure; and
   wherein the diagnosis target application execution file is an android package (APK) file, and said collecting the information further includes collecting information of a file path of the APK file or authentication certificate information.

* * * * *